(12) United States Patent
Gerk

(10) Patent No.: US 6,400,994 B1
(45) Date of Patent: Jun. 4, 2002

(54) PNEUMATIC POSITIONING CONTROL UNIT

(75) Inventor: Wilfried Gerk, Roedermark (DE)

(73) Assignee: Samson Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/339,520

(22) Filed: Jun. 24, 1999

(30) Foreign Application Priority Data

Jun. 25, 1998 (DE) .......................................... 198 28 380

(51) Int. Cl.$^7$ .............................................. G05B 19/18
(52) U.S. Cl. ........................... 700/66; 700/56; 700/186; 700/114; 700/192
(58) Field of Search ............................ 700/66, 192, 114

(56) References Cited

U.S. PATENT DOCUMENTS

| | | | | |
|---|---|---|---|---|
| 5,113,219 A | * | 5/1992 | Mayfield ..................... | 355/91 |
| 5,220,498 A | * | 6/1993 | Ohsawa et al. ............... | 700/66 |
| 5,685,707 A | * | 11/1997 | Ramsdell et al. ............. | 431/90 |
| 5,696,673 A | * | 12/1997 | Pryor .......................... | 700/66 |

OTHER PUBLICATIONS

Das System Fur Pneumatisch–Elektrisches by Steuern und Messen Mawomatic, Mayer Wonisch Mietzel GmbH.
Messsteuerungen Lagekontrollsytem Typ 923–0010, Ausgabe: Dezember 1995, Samsomatic Automationssysteme GmbH.
Messsteuerungen Lagekontrollsytem Typ 923–0013, Ausgabe: Januar 1997, Samsomatic Automationssysteme GmbH.
Steuereinheit NG 6, Freiblas–und Luftspaltkontrolle, Modulbauweise, Betriebsdruck 4 bis 8 bar (Eingangdruck Pe) Catalogregister P 20 Schrift 7502299.05.03.91, Herion–Werke KG–Fluidtronik.
Steuereinheit NG 6, Freiblas–und Luftspaltkontrolle, Monoblockbauweise, Betriebsdruck 3 bis 10 bar (Eingangsdruck Pe) Catalogregister P 20 Schrift 7502147.0501.97, Herion–Werke GmbH & Co. KG Fluidtronik.
Steuerinheiten, fur pneumatisches Messen Modell 200, Erfassen von Werkstucken, Werkzeugen und Positionen, Betriebsdruck 0 bis 12 bar, Katalogregister P20 Schrift 7502942.05.01.96, Herion–Werke KG, Fluidtronik.

* cited by examiner

Primary Examiner—William Grant
Assistant Examiner—Sheela S Rao
(74) Attorney, Agent, or Firm—William J. Sapone; Coleman Sudol Sapone, P.C.

(57) ABSTRACT

The invention is a unit for pneumatically controlling the position of a workpiece relative to a predetermined workpiece configuration, comprising an enclosure, a minimum of one measuring nozzle for a gaseous pressure medium, which measuring nozzle is located in a contact surface a workpiece fixture. A pressure supply line is connected to the measuring nozzle via pressure lines. Separate adjoining modular enclosure components are detachably connected to one another and each is fitted with a connection leading to measuring nozzle. A first enclosure end cover can be connected to a pressure supply unit and a second enclosure end cover is located at a distance from the first enclosure end cover. The first enclosure end cover, the modular enclosure components that adjoin the first enclosure end cover, and the second enclosure end cover that adjoins the modular enclosure components form the overall enclosure 68. At least the first enclosure end cover and the modular enclosure components are connected to one another by way of pressure lines. Each modular enclosure component has a throttling device coordinated with the nozzle and a differential pressure sensor located downstream from the throttling device to actuate a unit as soon as the pressure falls below or exceeds a predetermined pressure limiting value, the unit being actuated by the differential pressure sensor being a signaling unit and/or a display unit. Each modular enclosure component is fitted with a signaling unit and/or a display unit for the analog display of the pressure value that was measured by the pressure sensor.

14 Claims, 3 Drawing Sheets

PNEUMATIC POSITIONING CONTROL UNIT

TECHNICAL FIELD

The subject matter of this invention concerns a pneumatic positioning control unit for pneumatically controlling the position of a workpiece relative to a predetermined workpiece configuration.

BACKGROUND

Pneumatic position control units are known, there being, for example, a product manufactured by the firm of Samsomatic which is distributed as positioning controller Type 923-0010. This unit works on the basis of the dynamic pressure principle. The supply air flows at a constant preliminary pressure via a precision pressure regulator and a throttle valve through measuring nozzles which are built into a workpiece fixture. If correctly positioned, the workpiece shuts off the measuring nozzles. As a result, a dynamic pressure is generated between the measuring nozzles and the throttle valve. This pressure change is monitored by a pneumoelectric limit signal transmitter and displayed by means of a pressure gauge (analog display). As soon as the dynamic pressure reaches the set limiting value, a colored indicator light is turned off (digital display)—position okay—and the coordinated machine tool is turned on.

To avoid inaccuracies which can be caused, for example, by fluctuations of the supply pressure, another known positioning controller works on the basis of the differential pressure principle. This type of unit is distributed by the firm of Samsomatic as positioning controller Type 923-0013. In this case, the supply air flows at a constant preliminary pressure via a precision pressure regulator into a pressure divider and finally into a throttling device in the form of preliminary nozzles. The reference branch comprises a reference nozzle in which the sensitivity is set by means of an adjusting screw. In the measuring branch, the supply air flows through one or several measuring nozzles which are built into the workpiece fixture. If correctly positioned, the workpiece shuts off the measuring nozzles. As a result, a dynamic pressure is generated between the measuring nozzles and the preliminary nozzle. The pressure change is transformed by a piezoresistive pressure pickup into a proportional electric voltage signal which is applied to the electric analog display instrument via an electric measuring amplifier. The position is displayed by means of an indicator light which can light up in different colors.

In addition, there is a unit manufactured by the firm of Herion which pneumatically controls the position of a workpiece relative to a predetermined workpiece configuration in a workpiece fixture which comprises an enclosure base component and several modular enclosure components. When combined, the enclosure base component and the modular enclosure components form the overall enclosure. Each modular enclosure component is coordinated with a minimum of one measuring nozzle for a gaseous pressure medium in a contact surface of a workpiece fixture. Various modular enclosure components can be added to the overall unit, thus making it possible to include additional measuring nozzles to control the position in the workpiece fixture. The individual modular enclosure components are supplied by a supply air channel which leads from a pressure supply system inside the enclosure base component to the individual measuring nozzles. The measuring nozzles are coordinated with individual throttling devices as well as with a pressure sensor that is located downstream from the throttling device. As soon as the pressure falls below or exceeds a predetermined limiting value, the pressure sensor activates a signaling unit. The signaling unit is connected via signal lines to a central control unit. The limiting values for the individual pressure sensors are centrally set and transmitted via the signal lines to the signaling and/or display units (digital display).

As a result of the modular construction, it is easily possible to increase or to reduce the number of measuring nozzles and thus the number of measuring points depending on the requirements to be met in the workpiece fixture and on the shape of the workpiece.

The problem encountered, however, is that setting and displaying the limiting values and displaying the situation prevailing in the measuring nozzle is possible only by way of the central control unit and the two light-emitting diodes that display the minimum and the maximum value, respectively (digital display). The operating point in mid-position between the two limiting value's can be accurately set only by way of a complicated feedback system between the machine tool for the workpiece and a centrally located control unit, provided that it has an analog display.

In addition, there is a pneumatic positioning control unit manufactured by the firm of Saia which comprises light-emitting diodes that display the minimum and maximum limiting values (digital display). It is, however, not possible to monitor the precise mid-position of the operating point since the unit does not have an analog display.

Thus, the problem to be solved by this invention is to design a unit for pneumatically controlling the position, in particular of a workpiece, by means of which the drawbacks mentioned above are eliminated, which has a simple and versatile design, and which makes it possible to locally set and display the values.

SUMMARY OF THE INVENTION

According to the invention, a unit for pneumatically controlling the position of an object, in particular of a workpiece, relative to a predetermined workpiece configuration comprises an enclosure with a minimum of one measuring nozzle for a gaseous pressure medium, which measuring nozzle is located in a contact surface of a workpiece fixture, a common pressure supply unit connected to the nozzle by way of pressure lines, separate adjoining modular enclosure components detachably connected to one another, each fitted with a connection leading to the measuring nozzle, a first enclosure end cover which can be connected to the pressure supply unit and a second enclosure end cover that is located at a distance from the first enclosure end cover, the first enclosure end cover, the modular enclosure components that adjoin the first enclosure end cover, and the second enclosure end cover that adjoins the modular enclosure components forming the overall enclosure, at least the first enclosure end cover and the modular enclosure components being connected to one another by way of pressure lines, each modular enclosure component being fitted with a display unit for the analog display of a pressure value measured by a pressure sensor, and each modular enclosure component comprising one throttling device that is coordinated with the nozzle, and with a differential pressure sensor which is located downstream from the throttling device and which actuates a signaling unit and/or the coordinated display unit as soon as the pressure falls below or exceeds a predetermined pressure limiting value.

In this manner, a simple design is ensured, and the actual pressure value can be displayed directly on the modular enclosure component at any given time. In addition, it is possible to locally display the set pressure limiting values as well as the pressure as it reaches or exceeds its preset limiting values. This type of design is particularly suitable in cases in which extensive production lines with sophisticated machining centers are involved since it eliminates the need for a complicated feedback system from the central controller during the setting or monitoring of the unit.

To make it possible to set the pressure limiting values separately for the nozzles that are coordinated with the modular enclosure components, the modular enclosure components are fitted with suitable means.

According to one particular embodiment of this invention, the display on the modular enclosure component is designed in the form of an LED display. The pressure value in the LED display is shown in the section of the LED display that lights up.

As an alternative or as an added feature, the display unit comprises at least a multi-digit digital display which displays the pressure value measured by the pressure sensor and/or a quantity that is assigned to the pressure value, such as the distance of the workpiece from the nozzle. By means of the digital display, it is possible to adjust and monitor the function of the unit more accurately. For example, a master workpiece is accurately placed into the workpiece fixture. The digital display displays a specific reference value which is subsequently stored. After a certain operating time, the master workpiece is again accurately placed into the workpiece fixture. If the digital display at this time displays a different value, the unit must be reset or replaced. In this manner, it is possible to monitor the function of the unit simply and more accurately since the digital display is able to display a greater resolution and thus a more accurate pressure value. The placement of the workpiece at a local point is important because it also makes it possible to ensure that it has been properly placed, thus eliminating the possibility of differing results due to erroneous placement.

To avoid inaccuracies as a result of pressure fluctuations in the gaseous medium, for example, the unit for detecting the pressure change in the nozzle is designed on the basis of the differential pressure principle. An air discharge line for exhausting the air discharged from the reference nozzle that is coordinated with the nozzle is provided in a modular enclosure component; this air discharge line connects the separate modular enclosure components and at least the second enclosure end cover with one another, and the second enclosure end cover is fitted with an air discharge opening, preferably with a sound absorber.

Alternatively, the unit for detecting the pressure change can be designed on the basis of the dynamic pressure principle.

To ensure a simple and at the same time versatile signal and data transmission, a data bus connects the signaling unit and/or the sensor units of the separate modular enclosure components with a central control and/or monitoring unit. The data bus used for this purpose is preferably an ASI bus.

To make the installation easy, an ASI flat-type cable module is provided, which connects the data bus through an opening in the modular enclosure component to the signaling and sensor unit.

To further increase the versatility of the unit, the pressure limiting values of the pressure sensor of each modular enclosure component can be set by the central control and monitoring unit by way of the data bus.

According to one particular embodiment of this invention, each modular enclosure component has means for setting the zero point and the two limiting values of its coordinated pressure sensor. This ensures that the operating point and the limiting values can be simply adjusted once the position and surface of the workpiece are determined to be perfect.

To ensure a compact design, the contact surfaces of the modular enclosure components and of the two enclosure end covers made to fit one another.

To reduce the production costs, the two enclosure end covers and especially the modular enclosure components have an identical design.

Additional advantages and features are revealed in the description of an embodiment of this invention as illustrated by the drawings.

DETAILED DESCRIPTION OF THE INVENTION

Figure 1:
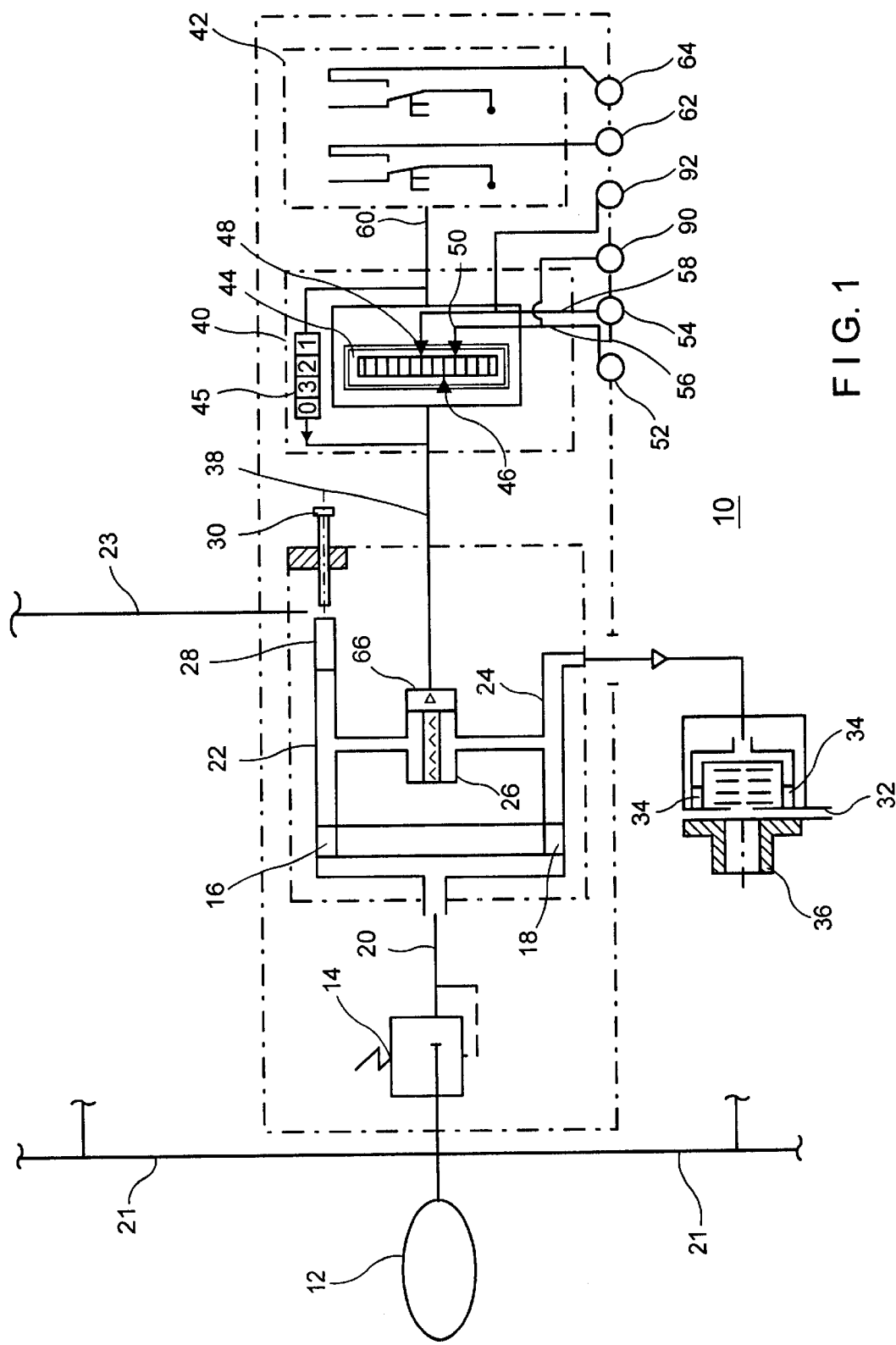
FIG. 1 shows a block diagram which illustrates the principle on which a unit (10) according to this invention functions.
Figure 2:
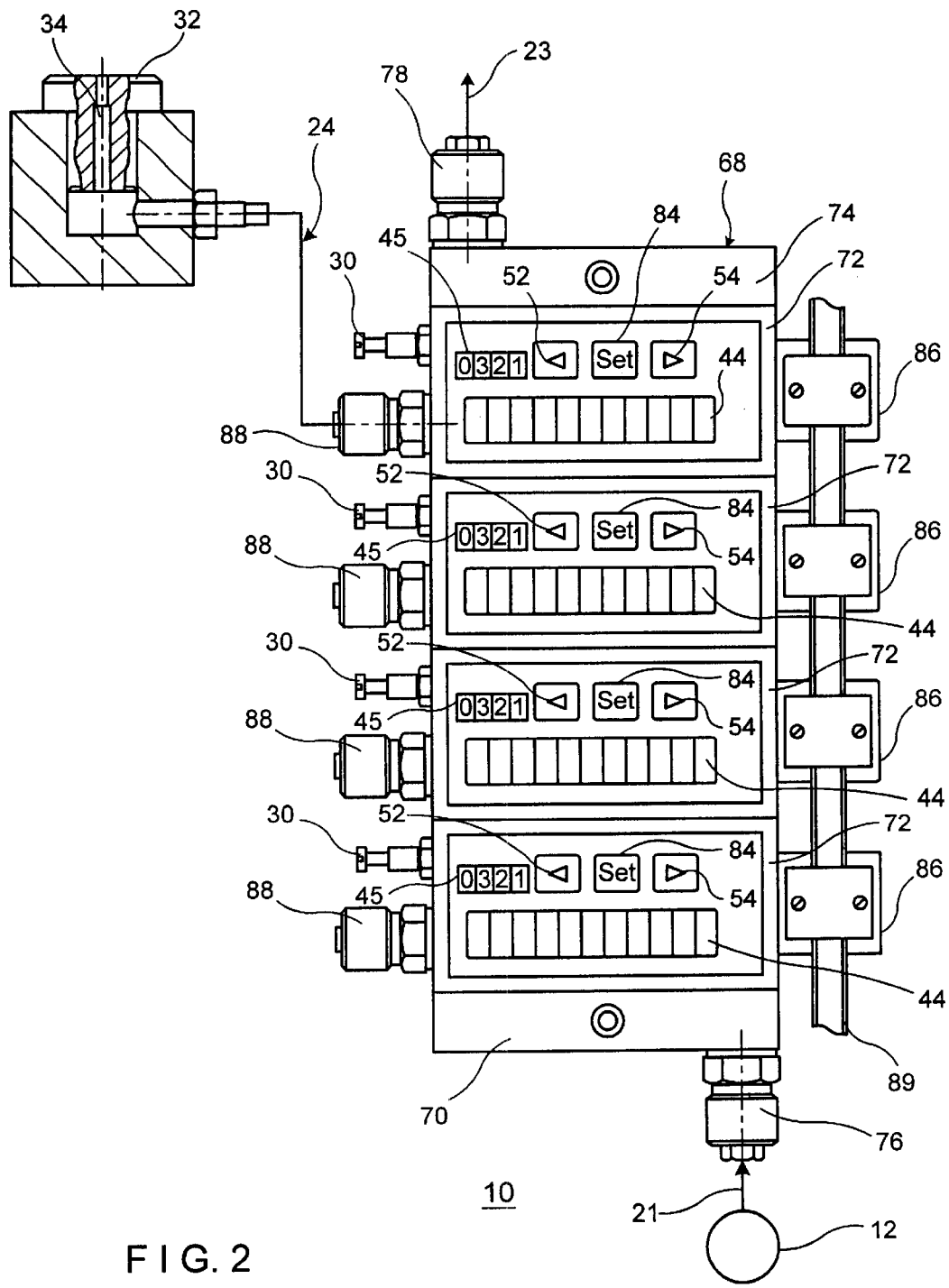
FIG. 2 is a top view of the enclosure of the unit with a nozzle.
Figure 3:
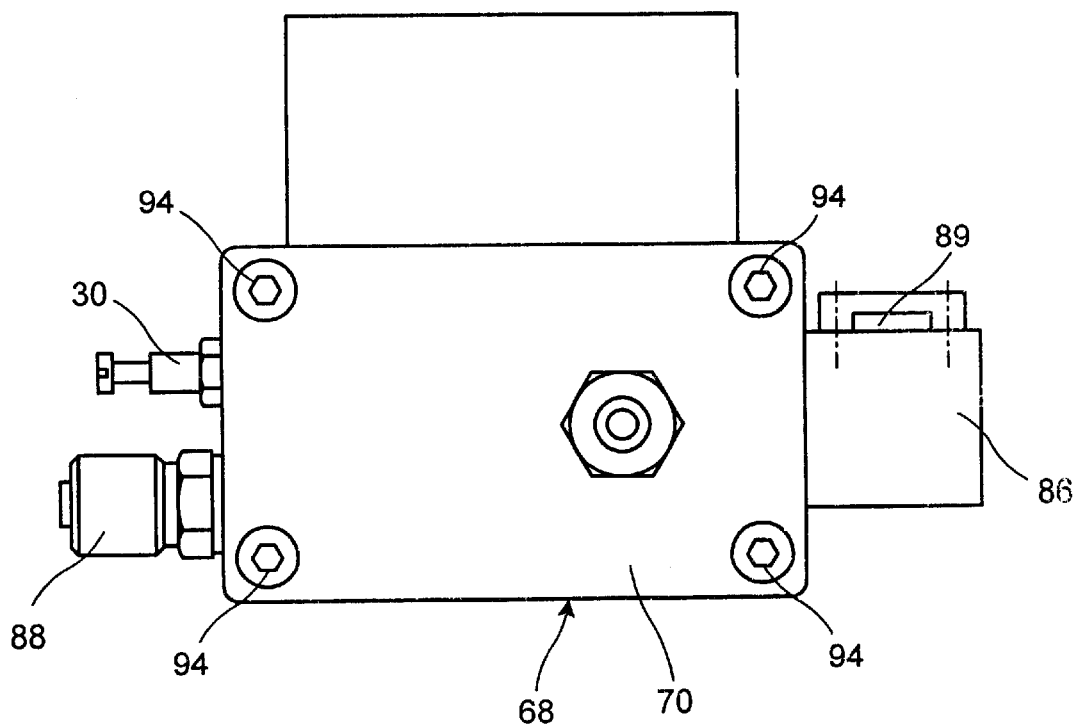
FIG. 3 is a lateral view of the unit shown in FIG. 2.

FIGS. 1 through 3 show a position control unit 10 according to this invention, with FIG. 1 showing the block diagram which illustrates how unit 10 works.

According to FIG. 1, a measuring pressure is generated by a pressure supply unit 12 via a precision pressure regulator 14. Via a pressure line 20, the measuring pressure is fed to preliminary nozzles 16 and 18 which are located parallel to each other and which act as throttling devices. The preliminary nozzle 16 is located in a reference branch 22 of the pressure line 20, and the preliminary nozzle 18 is located in a measuring branch 24 of the pressure line 20. A piezoresistive pressure pickup which functions as a pressure sensor 26 is located downstream from the preliminary nozzles 16 and 18. In the reference branch 22, the pressure sensor 26 is followed by a reference nozzle 28 which can be adjusted by way of an adjusting screw 30.

The measuring branch 24 is connected to two nozzles 34 which are located in a workpiece fixture 32. In this case, the nozzles 34 are integrated into a contact surface of a workpiece fixture 32. A workpiece 36 or a portion of a workpiece 36 is placed against the contact surface of the workpiece fixture 32.

A display unit 40 has a colored analog LED display 44 and a multi-digit digital display 45. For the sake of clarity, the sections of the LED analog display 44 in FIG. 1 which light up are especially marked by arrows 46 through 50.

Arrow 46 points to a section of the LED analog display 44 which corresponds to the value measured by the pressure sensor 26 at that time. Arrows 48 and 50 point to sections of the analog LED display 44 which define an upper and a lower limiting value. The limiting values can be set via actuating elements 52 and 54. For this purpose, the actuating elements 52 and 54 are connected to the display unit 40 by way of signal lines 56 and 58. The display unit 40 is connected to a signaling unit 42 by way of an additional signal line 60.

If the pressure falls below or exceeds an upper limiting value 48 or a lower limiting value 50, respectively, the signaling unit 42 sends an appropriate signal to a central control unit (not shown in the drawing) by way of output 62 or 64, respectively. In addition, this information, i.e., whether the value falls below or exceeds limiting value 50, is also available from a display unit 45, which is a digital display unit.

The four-digit digital display unit 45 displays the pressure value. With respect to the adjustment and control of the operation of the control unit, it is desirable to have the actual pressure value displayed. As an alternative, it is, however, also possible to assign a quantity to the pressure value, such as the distance of the workpiece 36 from the measuring nozzle 34.

Parallel to this control system on the basis of the substantially known differential pressure measuring principle, additional measuring systems which are similarly designed are connected to the pressure supply unit 12. Each modular enclosure component 72 has an integrated measuring system, which will be described in greater detail below.

Description of the Mode of Operation of a Measuring System:

Through the preliminary nozzles 16 and 18, a constant preliminary pressure is fed from the pressure supply unit 12 via a precision pressure regulator 14 into a pressure divider. In the reference branch 22, the sensitivity of the reference nozzle 28 is set by means of the adjusting screw 30. In the measuring branch 24, the supply air flows through the measuring nozzles 34 which are built into the workpiece fixture 32. If correctly placed, the workpiece 36 shuts off the measuring nozzles 34. As a result, a dynamic pressure is generated between the measuring nozzles 34 and the preliminary nozzle 18. The pressure change is transformed by the piezoresistive pressure pickup, i.e., pressure sensor 26, into a proportional electrical voltage signal which is transmitted by an electric measuring amplifier 66 through a signal line 38 to the display unit 40.

The pressure prevailing at that moment is displayed in the analog LED display 44 and in the four-digit digital display 45.

After the workpiece 36 has been placed into the workpiece fixture 32 and is located in the correct predetermined position in this workpiece fixture 32 so that the nozzles 34 are shut off, the dynamic pressure is generated. The dynamic pressure causes the upper limiting value 48 to be exceeded. Via the signing unit 42, an appropriate signal is transmitted to the central control unit. In addition, this status can be seen on the LED display 44, for example, from the specific color assigned to the various display sections. The digital display 45 displays the corresponding pressure value.

If the workpiece 36 is not properly positioned with respect to the measuring nozzles 34, the pressure value falls below a predetermined limiting value 50. In this case, a signal is transmitted via the signaling unit 42 to the central control unit—position not okay.

This status can also be read from the analog LED display 44 as already mentioned above, for example, by the specific color identification of the display sections.

FIGS. 2 and 3 show different views of the unit 10.

The unit 10 comprises an enclosure 68 which comprises a first enclosure end cover 70. In this particular embodiment, the first enclosure end cover 70 is connected to four modular enclosure components 72 which are designed to correspond to one another and which hold the measuring systems described above. A second modular enclosure component 74 is attached to the last modular enclosure component 72.

The first enclosure end cover 70 and the second enclosure end cover 74 are identical to each other but one is installed rotationally staggered by 180° with respect to the other.

The modular enclosure components 72 are also identical to one another. The adjacent surfaces of the modular enclosure components 72 and of the enclosure end covers 70 and 74 are fitted to one another to form a small compact enclosure 68.

Each enclosure end cover 70 and 74 is fitted with one connecting device 76 and 78, respectively, which can be conventional cable couplers. A connecting device 76 of the first enclosure end cover 70 is connected to the pressure supply unit 12. A connecting device 78 of the second enclosure end cover 74 is connected to a discharge opening (not shown).

Via the connecting device 76, supply air is fed into the enclosure 68. A supply air channel 21 extends from the connecting device 76 to the second enclosure end cover 74.

Parallel thereto, a discharge air channel 23 extends from the connecting unit 78 on the second enclosure end cover 74 to the first enclosure end cover 70. The supply air channels 21 open out into each of the modular enclosure components 72 where they supply the measuring system for controlling the position via the pressure line 20 which has been described with reference to FIG. 1. As in FIG. 1, the air supply channel is marked by reference number 21.

Each measuring system of a modular enclosure component 72 operates according to the same principle. The reference nozzles 28 of the measuring system of the modular enclosure components 72 open out into the discharge air channel 23, through which the discharge air is transported via the connecting device 78 from the modular enclosure components 72 and the enclosure 68. As in FIG. 1, the discharge air channel is marked by reference number 23. Each reference of the respective reference nozzle 28 can be set by means of the adjusting screw 30.

On the top surface of each modular enclosure component 72, the LED display 44 and the four-digit digital display are located. In addition, actuating elements 52 and 54 for setting the limiting values are located next to the analog LED display 44. An additional actuating element 84 for changing the setting of the upper or lower limiting value 48, 50 is provided between the two actuating elements 52 and 54.

Each modular enclosure component 72 is connected to the coordinated nozzles 34 in the workpiece fixture 32 via the respective measuring branch 24. For the sake of clarity, only one nozzle configuration is shown in FIG. 2.

The outputs from the modular enclosure component 72 to the nozzles are marked by reference number 88.

In an opening of the surface opposite to the surface on which output 88 is located, one bus interface module 86, e.g., for a flat-type cable, is provided, in each modular enclosure component 72. The bus interface module 86 transforms outputs 62 and 64 for the signaling unit 42, the analog signal for control inputs 62 and 64, and inputs 90 and 92 for display unit 40 for setting the limiting values from the central control and monitoring unit (not shown in the figure).

The flat-type cable modules 86 are connected to one another and to the central control and monitoring unit, e.g., by an ASI bus 89 as the data bus. Buses of this type are conventionally known and will therefore not be described in detail.

The modular enclosure components 72 and the enclosure end covers 70 and 74 are detachably connected to one another. For this purpose, appropriate screw connectors 94 are provided. Thus, if the need arises, it is easy and simple to insert additional or remove existing modular enclosure components 72, depending on the need for measuring nozzles 34 in the workpiece fixture 32 for specific workpieces 36 and tool centers.

FIG. 2 clearly illustrates that each modular enclosure component 72 comprises a digital display 45, an LED display 44, and actuating elements 52 and 54 and 84 for setting the pressure limiting values. It is possible at any time to locally set and adjust the pressure limiting values and to locally check and monitor the zero point and the situation prevailing in the coordinated nozzle 34 or the coordinated nozzles 34 at any given time without feedback from the central control and monitoring unit.

What is claimed is:

1. A unit for pneumatically controlling the position of a workpiece to a predetermined workpiece configuration, comprising:

an enclosure, a minimum of one measuring nozzle for a gaseous pressure medium located in a contact surface of a workpiece fixture a pressure supply unit connected to the measuring nozzle via pressure lines separately adjoining modular enclosure components detachably connected to one another, each fitted with a connection leading to the measuring nozzle, a first enclosure end cover which can be connected to the pressure supply unit and a second enclosure end cover located at a distance from the first enclosure end cover, the first enclosure end cover the modular enclosure components that adjoin the first enclosure end cover, and the second enclosure end cover that adjoins the modular enclosure components forming the overall enclosure, at least the first enclosure end cover and the modular enclosure components being connected to one another by the pressure lines each modular enclosure component being fitted with a throttling device coordinated with the nozzle and with a differential pressure sensor located downstream from the throttling device for actuating a unit as soon as a pressure falls below or exceeds a predetermined pressure limiting value the unit actuated by the differential pressure sensor being a signaling unit a display unit, each modular enclosure component fitted with a signaling unit and/or a display unit for the analog display of the pressure value measured by the pressure sensor.

2. The unit as claimed in claim 1 wherein each modular enclosure component has means for setting at least one pressure limiting value.

3. The unit as claimed in claim 1 wherein the display of the modular enclosure component is an LED display.

4. The unit as claimed in claim 1 wherein the display unit further comprises at least a multi-digit digital display which displays a pressure value measured by the pressure sensor and/or a quantity that has been assigned to the pressure value.

5. The unit as claimed in claim 1 wherein the unit measures a pressure change in the nozzle on the basis of a differential pressure principle.

6. The unit as claimed in claim 5 wherein a modular enclosure component is fitted with a discharge air channel for exhausting air discharged from the reference nozzle that is coordinated with the nozzle, the discharge air channel connecting the separate modular enclosure components to one another and to at least the second enclosure end cover, the second enclosure end cover having a discharge air opening.

7. The unit as claimed in claim 1 wherein the unit measures a pressure change on the basis of a dynamic pressure principle.

8. The unit as claimed in claim 1 further comprising a data bus for connecting the signaling units and/or the sensor units of each modular enclosure components to a central control and monitoring unit.

9. The unit as claimed in claim 8 wherein the data bus is connected via a flat-type cable module through an opening in the modular enclosure component to the central control and monitoring unit.

10. The unit as claimed in claim 8 wherein the pressure limiting values of the pressure sensor of each modular enclosure component are set table via the data bus by the central control and monitoring unit.

11. The unit as claimed in claim 1 wherein each modular enclosure component has means for setting a zero point of the pressure sensor.

12. The unit as claimed in claim 1 wherein the contact surfaces of the modular enclosure components and of the two enclosure end covers are fitted to one another.

13. The unit as claimed in claim 1 wherein each enclosure end cover has an identical design.

14. The unit as claimed in claim 1 wherein each modular enclosure component has an identical design.

* * * * *